(12) United States Patent
Krasney

(10) Patent No.: US 6,863,535 B2
(45) Date of Patent: Mar. 8, 2005

(54) PERSONAL MNEMONIC GENERATOR

(75) Inventor: Jack G. Krasney, 27 Fabian Place, Etobicoke, Ontario (CA), M9P 2X6

(73) Assignee: Jack G. Krasney, Mississauga (CA)

( * ) Notice: Subject to any disclaimer, the term of this patent is extended or adjusted under 35 U.S.C. 154(b) by 0 days.

(21) Appl. No.: 10/266,650

(22) Filed: Oct. 8, 2002

(65) Prior Publication Data
US 2003/0068604 A1 Apr. 10, 2003

Related U.S. Application Data

(60) Provisional application No. 60/327,915, filed on Oct. 9, 2001.

(51) Int. Cl.[7] .............................................. G09B 19/00
(52) U.S. Cl. ...................... 434/236; 434/156; 434/322; 434/428
(58) Field of Search ................................ 434/156, 157, 434/167, 177, 236, 238

(56) References Cited

U.S. PATENT DOCUMENTS

| | | | |
|---|---|---|---|
| 4,543,631 A | | 9/1985 | Kurosu |
| 4,734,038 A | | 3/1988 | Dennis |
| 4,770,636 A | | 9/1988 | Buschke |
| 4,789,162 A | * | 12/1988 | Harris .......................... 273/272 |
| 5,203,704 A | | 4/1993 | McCloud |
| 5,246,375 A | | 9/1993 | Goede |
| 5,435,564 A | * | 7/1995 | Kennedy et al. ............. 273/237 |
| 5,601,432 A | | 2/1997 | Bergman |
| 5,772,441 A | * | 6/1998 | Wilson ........................ 434/236 |
| 5,997,306 A | | 12/1999 | Delphonse |
| 6,022,222 A | | 2/2000 | Guinan |
| 6,077,085 A | * | 6/2000 | Parry et al. .................. 434/322 |
| 6,386,543 B1 | * | 5/2002 | Luker ........................... 273/272 |
| 6,447,229 B1 | * | 9/2002 | Schlough ........................ 412/1 |
| 2003/0139210 A1 | * | 7/2003 | Raben ............................ 463/9 |

* cited by examiner

Primary Examiner—Derris H. Banks
Assistant Examiner—John Sotomayor
(74) Attorney, Agent, or Firm—Brian S. Steinberger; Law Offices of Brian S. Steinberger, P.A.

(57) ABSTRACT

An apparatus and method of generating acrostic mnemonic devices from finite data sets of customized areas of specific interest provided by the user to assist in improving the memory of the user. The apparatus provides a personalized mnemonic generating program embodied on a computer-readable medium for improving a users' memory of finite data sets based on the user's customized areas of interest to generate easy "to-be-remembered" acrostic mnemonic devices in the form of meaningful grammatically correct sentences. The method generates acrostic mnemonic devices from finite data sets whereby customized areas of specific interest are provided by the user to assist in improving the memory of the user which is executed by a computing device.

34 Claims, 7 Drawing Sheets

Fig.4

Would you like to:

- Create a New Memory List? ⎯⎯► (Fig.5)

Review an Old Memory List?

Fig.5

Create a New Memory List

What would you like to call your list?

| Wrist Bones |

( Enter ) ⎯⎯► 3 (Fig.6)

Fig.6

Create a New Memory List

This list is called: "Wrist Bones"

Type in the items you want to remember below:

| Hamate | |
| Capitate | |
| Triangular | |
| Pistoform | |
| Lunate | |
| Multangular | |

Enter ⟶ 4 (Fig.7)

Fig.7

Create a New Memory List

This list is called: "Wrist Bones"

Your list items include:

- Hamate
- Capitate
- Triangular
- Pistoform
- Lunate
- Multangular

Search using first ☐ letter(s)

Type in your personal interest category below:

Baseball

Generate Mnemonic ⟶ 5 (Fig.8)

Your Memory List is called: "Wrist Bones"
Acrostic Mnemonic: "Baseball"
Your list items include:

(How can teams perform late miracles?)

What would you like to do?

Testing Section

Your Memory List is called: "Wrist Bones"

Acrostic Mnemonic: "Baseball"

Your list items include:

Fig.10

- Hamate — How
- Capitate — Can
- Triangular — Teams
- Pistoform — Perform
- Lunate — Late
- Multangular — Miracles?

Click here to Test Yourself (How can teams perform late miracles?)

Testing Section

Fig.11

Your Memory List is called: "Wrist Bones"

Acrostic Mnemonic: "Baseball"

Your list items include:

- Hamate — How
- Capitate — Can
- Triangular — Teams
- Pistoform — Perform
- Lunate — Late
- Multangular — Miracles?

Fill in the blanks for each space then score yourself

Click here to Score Yourself (How can teams perform late miracles?)

PERSONAL MNEMONIC GENERATOR

This invention relates to a novel apparatus and method of generating acrostic mnemonic devices in the form of grammatically correct sentences, in particular the generation of an acrostic mnemonic device from finite data sets selected from customized areas of specific interest is provided by the user to improve memory, and this invention claims the benefit of priority to U.S. Provisional Patent Application Ser. No. 60/327,915 filed Oct. 9, 2001.

BACKGROUND OF THE INVENTION

Mnemonics have been used as methods for remembering information that may otherwise be difficult to recall, and is a rehearsal or re-coding strategy and can be used as the basis for grouping the stimulus items to be recalled. Formal mnemonic devices generally rely on a pre-established set of memory aids in addition to some practice on the to-be-remembered information in connection with the pre-established set. The strengths of mnemonic techniques are many and can include: repeating the material to be remembered in a repeated fashion, and integrating the material to be remembered into an existing memory framework.

For most people, it is easier to remember an image or story incorporating words than it is to remember strings of digits. Mnemonics are well known to be used as an aid in memorizing words and numbers. It is over 300 years old and was introduced by Stanislaus Mink von Wennsshein and later developed by Dr Richard Grey. A "Phonetic Mnemonic" is system developed three hundred years ago, in 1648, by Winckelman who introduced a system where digits were represented by letters of the alphabet. In the 18th and 19th century, this memory system was further refined and it has remained essentially unchanged throughout the 20th century.

The key aspect of the phonetic mnemonic is that digits are represented by consonant sounds (the term 'phonetic' refers to speech sounds). This allows the fabrication of large numbers of peg words to be used in mental filing systems. It is also possible to code numbers directly into words and sentences. It works by converting numbers into words. The words can then be remembered more easily, especially when using other techniques such as exaggerations of concepts involving multiple senses (vision, sound, smell). Each digit is mapped onto a number of consonants. Vowels and the consonants are ignored and can be used as 'fillers' to make up sensible words from the resulting consonant sequences. The mapping is: 0: s,z; 1: d,t,th; 2: n,ing; 3: m, 4: r; 5: 1; 6: j,sh,ch,zh (like the s in vision); 7: k,hard g; 8: f,v; 9: b,p.

It is the sounds that matter, not the spelling. Each digit maps to a set of sounds with similar mouth and tongue positions. For example, to remember the year in which the National Portrait Gallery in London was opened (1856), we first perform the mapping: 1->d, t,th; 8->f,v; 5->1; 6->j,sh, ch,zh. So we can make up 'DaFfy LoDGe', and we think of the Portrait Gallery as a lodge in which Daffy Duck resides (the more silly the image, the easier it is to recall). However, the problem with this system is that it takes some people more time to master than the others and is not computer based. This system only converts numerical information to alphabetical information and vice versa. This information does not teach converting a memory list in a customized areas of interest into a mnemonic sentence which can easily be remembered.

U.S. Pat. No. 5,772,441 issued on Jun. 30, 1998 to Henry Allen Wilson describes a visually reinforced learning and memorization system which combines the coordination of alphabetic mnemonics, number integers, and colors to provide the user with multiple mechanisms for learning memorizing information. The memorization system is particularly suited for memorizing geographic information, using a diamond-based coordinate system. This system does not teach or suggest using customized areas of interest having a list of items that can be remembered by mnemonic sentencing. This system partially integrates the phonetic system similar described above.

U.S. Pat. No. 4,543,631 issued on Sep. 24, 1985 to Kurosu et al., teaches a text inputting device which includes a keyboard for imputing a string of characters of a first kind by keying keys, and a first device for displaying characters of a second kind corresponding to the character string supplied from the keyboard as candidate characters, and selecting a desired character of the second kind from the candidate characters for supplying it to a processor. A second device is for reading a character of the second kind corresponding to a mnemonic code in the character string supplied from the keyboard for supplying it to the processor. A selection switch is used selectively activating the first or the second device when a character of the second type is to be inputted. This device is specifically used to input complex texts such as Japanese or other language texts. However, this device also does not teach memorizing items of a list in customized selectable interest areas which are to be remembered through mnemonic sentencing.

Other systems have been developed for coordinating letters with numbers and are shown in U.S. Pat. No. 4,542, 477 to Noyori et al., U.S. Pat. No. 4,734,038 to Larry W. Dennis, U.S. Pat. No. 4,770,636 to Herman Buschke, U.S. Pat. No. 5,203,704 to Seth R. McCloud, U.S. Pat. No. 5,246,375 to Wouter Goede, U.S. Pat. No. 5,601,432 to Marilyn M. Bergman, U.S. Pat. No. 5,997,306 to Joseph B. Delphonse, and U.S. Pat. No. 6,022,222 to Mary Beth Guinan.

The systems in the above patents are generally limited to mnemonic aids that are visually based and do not use customized selectable interest areas which are to be remembered through mnemonic sentencing. Many of theses patents do not teach a mnemonic customization tool function that permits the users to replace pieces of an automatically generated, acrostic mnemonic sentence word by word or in its entirety. In addition, none of the above patents describe a custom interest area database that affords users the ability to establish personalized interest areas and content items for those areas in any language the user desires. Furthermore, a mnemonic memorization tool for facilitating, reinforcing, and the recall of mnemonic devices. Customized memory list items are not taught, as well as testing and feedback systems that permits the user to practice the mnemonic and associated customized memory list items to mastery.

SUMMARY OF THE INVENTION

The primary objective of the subject invention is to provide a software based mnemonic generator that provides the users with instructions on the use of the mnemonic devices to improve memory for finite data sets based on a user's customized lists of items that require exact recall and the tools to create personalized mnemonic devices based on user specific inputs, as well as personalized replacement functions to an already generated acrostic mnemonic sentence or word. The user's customized areas of interest generate easy "to-be-remembered" acrostic mnemonic devices in the form of meaningful grammatically correct sentences utilizing a grammar-based mnemonic generation engine.

The second object of the present invention to provide a mnemonic customization tool permitting users to add new items to the category interest areas or define their own interests.

The third object of the present invention to provide a personalized mnemonic generating program that is created from a customized interest area database specific to the personal interest input of the user.

The fourth object of the present invention to provide a mnemonic memorization tool for facilitating, reinforcing, and the recall of the acrostic mnemonic devices and memory lists; as well as providing a test and feedback system permitting the user to practice mnemonic and associated memory list items to mastery, making it easier and more fun for the user to recall the "need-to-remember" information.

The fifth object of the present invention to provide an acrostic mnemonic device that is customized to the user's own specific learning choices and cognitive processes.

The present invention relates to a software-based memory tool and method of using a memory tool. The apparatus and method of the present invention includes a memory tool that generates acrostic mnemonic devices from finite data sets (memory list—ML) of customized areas of specific interest provided by the user to assist in improving memory.

A preferred embodiment of the personal mnemonic generating program is embodied on a computer-readable medium and includes at least one computing device having a memory, at least one processor, and displaying information to a computer user, the computing device is utilized for processing components and coded functions executed by the computer device, memory list entry function, standard dictionary and thesaurus functions having at least one multi-lingual words database, dictionary and thesaurus customization tools, standard and customized interest area databases, graphical user interface, grammar based mnemonic generation engine function, mnemonic customization and memorization tool functions, at least one storage database, letter inclusion adjustment function, cognition level function, and user system override that can be utilized at any time.

A preferred method of the present invention includes the steps of: inputting new items (ML) to be remembered to create a new acrostic mnemonic sentence, which further includes the steps of selecting a preferred language, inputting the list of items (ML) the user chooses to remember, selecting an area of interest from the interest area database (IAD), or creating and inputting a new customized interest area database (CIAD) from which an acrostic mnemonic device is generated.

A preferred method of the present inventions further includes the steps of: generating an acrostic mnemonic device from items (words, etc.) in the interest area database (IAD) or the customized interest area database (CIAD) and from a grammar-based mnemonic generation engine function using words from a multi-lingual word database, finalizing the acrostic mnemonic device, actuating the mnemonic memorization tool function to test user to recall the finalized acrostic mnemonic device and providing feedback from the mnemonic memorization tool function that permits the user to practice the finalized acrostic mnemonic device and the associated memory list (ML) to mastery, actuating the mnemonic memorization tool function for facilitating, reinforcing, and recalling of the acrostic mnemonic device and the memory item list (ML), actuating the mnemonic customization tool function permitting the user to replace pieces of automatically generated, acrostic mnemonic devices piece by piece or in its entirety, and saving the finalized acrostic mnemonic device, the associated item list (ML), and the users test history in an integrated searchable database.

The apparatus and method of the present invention includes for generating acrostic mnemonic devices by a personalized mnemonic generating program embodied on a computer-readable medium for improving the users' memory of finite data sets based on the user's customized areas of interest to generate easy "to-be-remembered" acrostic mnemonic devices, preferably, in the form of meaningful grammatically correct sentences. Thus, before the program generates an acrostic mnemonic sentence, the user would be prompted to input the specific category of his/her interest area group. The present invention affords individual users the capacity to tie memory list (ML) (to-be remembered items) to these acrostic mnemonic devices (sentences) generated from customized areas of specific personal interest to the user.

Further objects and advantages of this invention will be apparent from the following detailed description of a presently preferred embodiment which is illustrated schematically in the accompanying drawings.

BRIEF DESCRIPTION OF THE DRAWINGS

FIG. 4 shows a first screen menu page of the invention.

FIG. 5 shows a second screen page for creating a title of a new memory list from the menu page of FIG. 4.

FIG. 6 shows a third screen page for listing the items to be remembered for the new list of FIG. 5.

FIG. 7 shows a fourth screen page for typing in a personal interest category title for the listed items of FIG. 6.

FIG. 10 shows a seventh screen page for testing the user by having the user input the list of items after clicking on the "Test Yourself" icon in FIG. 8.

FIG. 11 shows another screen page of FIG. 10 that allows the user to score themselves by filling in the blank spaces.

DETAILED DESCRIPTION OF PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
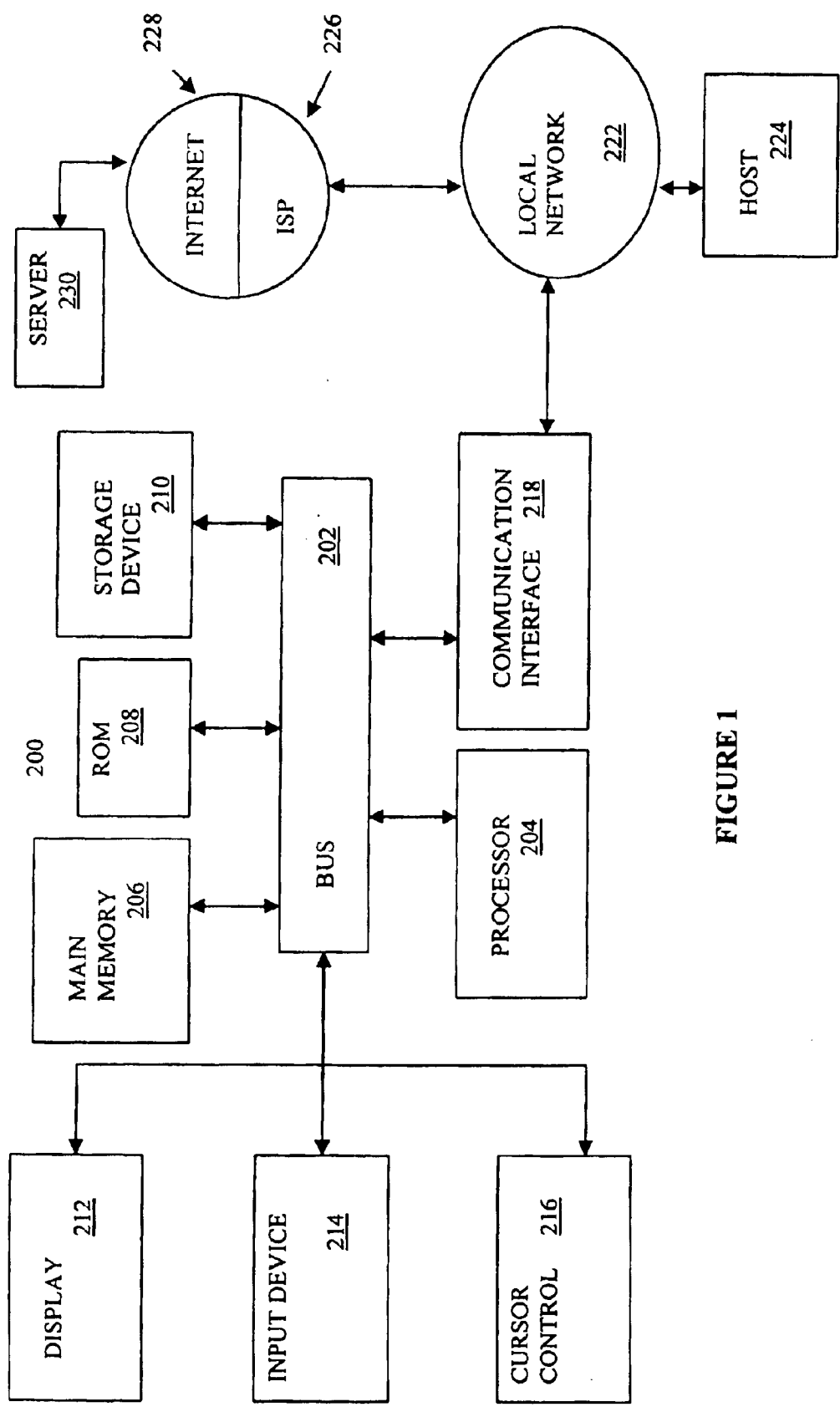
FIG. 1 illustrates a block diagram of a computer system upon which an embodiment of the personal mnemonic generator may be implemented according to the present invention.
Figure 2:
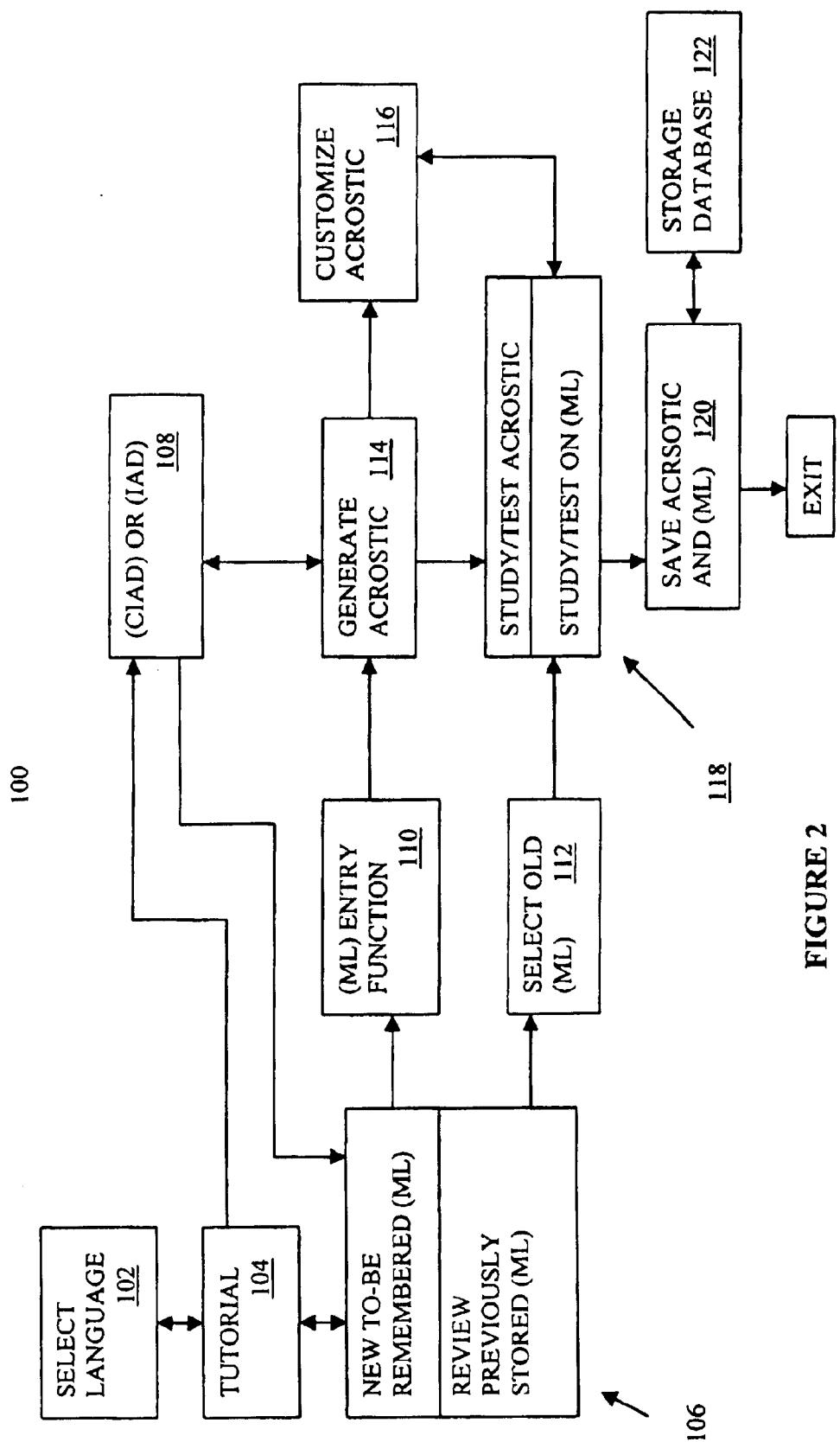
FIG. 2 illustrates a block diagram showing the steps in order to generate an acrostic mnemonic device and to test the user's performance and provide feedback information to improve the memory of the user according to the present invention.
Figure 3:
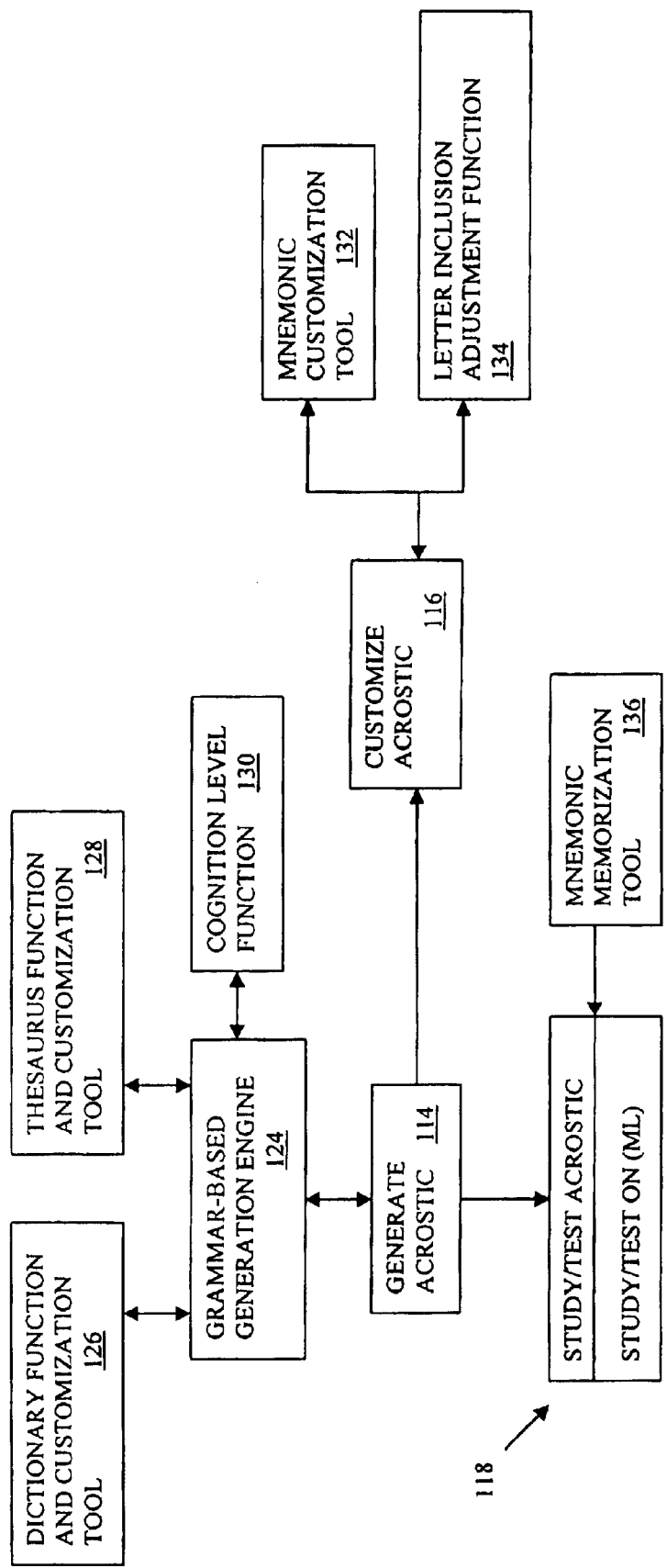
FIG. 3 illustrates a block diagram showing the steps involved in generating an acrostic, customizing an acrostic, and utilizing the mnemonic memorization tool function according to the present invention.

FIGS. 1, 2 and 3 illustrate the present invention which is an apparatus and method of generating acrostic mnemonic devices 114 from finite data sets (memory list—ML) 110 or 112 of areas of specific interest 108 provided by the user to assist in improving memory. A mnemonic device can be described as a generated acrostic mnemonic sentence. The preferred embodiment of the personal mnemonic generating program is embodied on a computer-readable medium which includes: at least one computing device 200 having a memory, at least one processor, and means for displaying information to the user, wherein the computing device 200 is utilized for processing components and coded functions executed by the computer device 200; memory list entry function 106; standard dictionary and thesaurus functions 126 and 128 having at least one multi-lingual words database, dictionary and thesaurus customization tools 126 and 128; standard and customized interest area databases 108; graphical user interface; grammar based mnemonic generation engine function 124; mnemonic customization 132 and memorization 136 tool functions; at least one storage database 122; letter inclusion adjustment function 134; cognition level function 130; and user system override that can be utilized at any time.

The preferred method of the present invention includes the steps of: inputting new items (ML) to be remembered to create a new mnemonic device 106, which further includes the steps of selecting a preferred language 102, inputting the list of items (ML) 110 the user chooses to remember, selecting an area of interest from the interest area database (IAD), or creating and inputting a new customized interest area database (CIAD) 108 from which an acrostic mnemonic device is generated 114.

The method of the present inventions further includes the steps of: generating an acrostic mnemonic device 114 from items 110 (words, etc.) in the interest area database (IAD) or the customized interest area database (CIAD) 108 and from a grammar-based mnemonic generation engine function 124 using words from a multi-lingual word database, finalizing the acrostic mnemonic device; actuating the mnemonic memorization tool function 136 to test 118 the user to recall the finalized acrostic mnemonic device and providing 118 feedback from the mnemonic memorization tool function 136 that permits the user to practice the finalized acrostic mnemonic device and the associated memory list (ML) 110 or 112 to mastery; actuating the mnemonic memorization tool function 136 for facilitating, reinforcing, and recalling 118 of the acrostic mnemonic device 114 and the memory item list (ML) 110 or 112; actuating the mnemonic customization tool function 132 permitting the user to replace pieces of automatically generated, acrostic mnemonic devices 116 piece by piece or in its entirety; and saving 120 the finalized acrostic mnemonic device, the associated item list (ML) 110 or 112, and the users test history in an integrated searchable database 112.

In a most preferred embodiment of the present invention 100 the apparatus and method for generating acrostic mnemonic devices by a personalized mnemonic generating program is embodied on a computer-readable medium for improving a users' memory of finite data sets based on the user's customized areas of interest to generate easy "to-be-remembered" acrostic mnemonic devices; preferably, in the form of meaningful grammatically correct sentences. Thus, before the program generates an acrostic sentence 114, the user would be prompted to input the specific category of his/her interest area group 108. The present invention 100 affords individual users the capacity to tie memory list (ML) items 110 or 112 (to-be remembered) to these acrostic mnemonic devices (sentences) 114 generated from areas of specific interest 108 to the user.

Acrostics are defined as a composition, usually in verse, in which the initial, final or other prearranged letters, numbers, or symbols, in each line when taken together spell out a meaningful word, sentence, or alphanumerical (including symbols) item. Acrostics are preferably generated by using the first letter (or potentially the first two to three letters) from each word in a 'to-be remembered' memory list or data set (ML) 110 or 112 to create a sentence; in the case of this program 100, a sentence with the users' chosen category 108 as the sentence's "concept." When the sentence is recalled 118, ideally the first letter of each word provides a retrieval cue for a word in the 'to-be remembered' memory list (ML) 110 or 112 from whence the letter originated. One of the most fundamental characteristics of memory is semantic organization based on individual experiences, language, and meaningful associations. The present invention 100 meets this source of individual memory structure to improve recall by presenting users with acrostics customized 116 to fit within their personal memory framework by allowing them to identify general interest areas 108 derived from their unique life experiences.

The present invention 100 includes a grammar-based generation engine function 124 for creating the acrostic mnemonic devices 114 and at least one word database organized by a baseline of generic interest areas 108. Each database 108 permits for customization in that the users can add new items (ML) 110 to the category interest areas (interest area database—IAD) or define their own interest areas (customized interest area database—CIAD) 108. A training and testing function 118 permits the user to master both the acrostic mnemonic devices 114 and the memory lists (ML) 110 or 112.

FIG. 1 is a block diagram that illustrates a preferred computer system 200 upon which an embodiment of the invention may be implemented. The computer system 200 includes a bus 202 or other communication mechanism for communicating information, and a processor 204 coupled with bus 202 for processing information. The computer system 200 also includes a main memory 206, such as random access memory (RAM) or other dynamic storage device, coupled to the bus 202 for storing information and instructions to be executed by a processor 204. Main memory 206 also may be used for storing temporary variable or other intermediate information during execution of instructions to be executed by processor 204. The computer system 200 further includes a read only memory (ROM) 208 or other static storage device coupled to a bus 202 for storing static information and instructions for processor 204. A storage device 210, such as a magnetic disk or optical disk, is provided and coupled to the bus 202 for storing information and instructions.

The computer system 200 may be coupled via the bus 202 to the display 212, such as a cathode ray tube (CRT), for displaying information to the computer user. An input device 214, including alphanumeric and other keys, is coupled to the bus 202 for communicating information and command selections to processor 204. Another type of input user device is a cursor control 216, such as a mouse, a trackball, or cursor direction keys for communicating direction information and command selections to processor 204 and for controlling cursor movement on display 212. This input device typically has two degrees of freedom in two axes, a first axis (e.g. x) and a second axis (e.g. y), that allows the device to specify positions in a plane.

The present invention is preferably executed by the computer system 200 for practicing the invention. According to one embodiment of the invention, practicing the present invention is provided by computer system 200 in response to processor 204 processing one or more sequences of one or more instructions contained in main memory 206. Such instructions may be read into main memory 206 from another computer-readable medium, such as storage devices 200. Execution of the sequences of instructions contained in main memory 206 causes the processor 204 to perform the process steps described herein. One or more processors in a multi-processing arrangement may also be employed to execute the sequences of instructions contained in main memory 206. In alternative embodiments, hard-wire circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 204 for execution. Such a medium may take many forms, including, but not limited to, non-volatile media, volatile media, and transmission media. Non-volatile media include, for example, optical or magnetic disks, such as storage devices 210. Volatile media includes dynamic memory, such as a main memory 206. Transmission media include coaxial cables, copper wire, and fiber optics, and including the wires that comprise the bus 202. Transmission media can also take the form of acoustic or light waves, such as those generated during radio frequency (RF) and infrared (IR) data communications. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, RAM, PROM, EPROM, FLASH-EPROM, any other memory chip or cartridge, carrier wave as described hereinafter, or any other medium form which a computer can read.

Various forms of computer-readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to the bus 202 can receive the data carried in the infrared signal and place the data to the bus 202. The bus 202 carries the data to main instructions received by the main memory 206 and may optionally be stored on storage devices 210 either before or after execution by a processor 204.

The computer system 200 also includes a communication interference 218 coupled to the bus 202. Communication interface 218 provides a two-way data communication coupling to a network link 220 that is connected to a local network 222. For example, a communication interface 218 may be an integrated services digital network (ISDN) card or a modem to provide a data communication connection to a corresponding type of telephone line. As another example, a communication interface 218 may be a local area network (LAN) card to provide a data communication connection to a compatible LAN. Wireless links may also be implemented. In any such implantation, a communication interface 218 sends and receives electromagnetic or optical signals that carry digital data streams representing various types of information.

Network links 220 typically provides data communication through one or more networks to other data devices. For example, a network link 220 may provide a connection through local networks 222 to a host computer 224 or to data equipment operated by an Internet Service Provider (ISP) 226. ISP 226 in turn provides data communication services through the worldwide packet data communication network; now commonly referred to as the "Internet" 228. Local networks 222 and the Internet 228 both use electrical, electromagnetic, or optical signals that carry digital data streams. The signals through the various networks, signals on network links 220 and signals through communication interfaces 218, which carry the digital data to and from the computer system 200, are exemplary forms of carrier waves transporting the information.

The computer system 200 can send messages and receive data, including program codes, through the network(s), network links 220, and communication interfaces 218. In the Internet example, a server 230 might transmit a requested code for an application program through the Internet 228, ISP 226, local network 222, and communication interface 218. In accordance with the present invention, one such download application provides for practicing the invention as described herein.

The received code may be executed by the processor 204 as it is received, and/or stored in storage devices 210, or other non-volatile storage for later execution. In this manner, the computer system 200 may obtain an application code in the form of a carrier wave.

A computed-readable medium is any article of manufacture that contains data that can be read by a computer or a carrier wave signal. For example, the personal mnemonic generator may be distributed on magnetic media, such as a floppy disk, flexible disk, hard disk, reel-to-reel tape, cartridge tape and cassette tape; optical media, such as CD-ROM and writable compact disk; and paper media, such as punched cards and paper tape; or on a carrier wave signal received through a network, propagated signal, wireless network, or modem, including radio-frequency signals and infrared signals. A propagated signal is directed to an article of manufacture in the form of a manufactured but transient signal, such as an electrical, optical, or acoustical signal. These signals can be downloaded from a World Wide Web site over the Internet.

FIGS. 2 and 3 illustrates the most preferred embodiment of the present invention 100 which includes a personal mnemonic generating program embodied on a computer-readable medium for improving the user's memory of finite data sets based on the user's customized areas of interest to generate "to-be remembered" sentences. This embodiment includes at least one computing device 200 having a memory, at least one processor, and a means for displaying information to a user. The computing device 200 is preferably a computer and is utilized for processing components and coded functions.

The coded functions and components include, but are not limited to, a memory list entry function 110 or 112, standard dictionary and thesaurus functions 126 and 128 having at least one multi-lingual words database, dictionary and thesaurus customization tool functions 126 and 128, standard and customized interest area databases 108, and at least one graphical user interface, grammar-based mnemonic generation engine function 124, mnemonic customization 132 and memorization 136 tool functions, at least one storage database 122, letter inclusion adjustment function 134, cognition level function 130, print function, and a user system override that can be utilized at any time.

The memory list entry function 110 or 112 is a coded function permitting the user to input and store lists of items (ML) to remember. The standard dictionary function 126 is at least one multi-lingual words database. The dictionary customization tool function 126 is a coded function permitting new words to be added to the standard dictionary. The standard thesaurus function 128 is at least one multi-lingual word database based on semantic relationships between items. The thesaurus customization tool function 128 is a coded function permitting new words to be added to the standard thesaurus.

The standard interest area database (IAD) 108 is a database including common, multi-lingual words from selected interest areas. The custom interest area database (CIAD) function 108 is a database function affording users the ability to establish personalized interest areas and content items for those areas in any language. The grammar-based mnemonic generation engine function 124 is a coded function for generating acrostic mnemonic sentences 114 based on grammatically correct sentences in multiple languages 102. The mnemonic customization tool function 132 is a coded function permitting the user to replace pieces of an automatically generated, acrostic mnemonic sentence 116 word by word or in its entirety. The mnemonic memorization tool function 136 is a coded function for the facilitating, reinforcing, and recalling 118 of the acrostic mnemonic device 114 and memory lists (ML) 110 or 112. The mnemonic memorization tool function 136 also includes a testing and feedback system 118 permitting the user to practice the acrostic mnemonic devices 114 and associated memory list (ML) items 110 or 112 to mastery.

The graphical user interface (GUI) is an interface for collecting inputs and providing outputs. The storage database 122 is a searchable database function for saving 120 memory lists 110 or 112, user-generated interest information, acrostic mnemonic sentences 114, and user testing and feedback information 118. The print function is a coded function for printing both user inputs and system outputs. The letter inclusion adjustment function 134 is a coded function for adjusting the number of letters to be utilized in an acrostic mnemonic sentence 114. The cognition level function 130 is a customizing function selecting or permitting for individual cognitive differentials. The individual cognitive differentials include, but are not limited to, age, intellect, and disability of the user. For example, the individual cognitive differentials would include an elementary-based acrostic sentence generation or a more sophisticated-based acrostic sentence generation. The user system override and customization tool function 132 are for modifying a generated acrostic mnemonic sentence 114 at any time. The user may modify new acrostics or previously stored acrostics by personally changing one, or more of the words within a given mnemonic device (sentence) 114.

Although the acrostic mnemonic device 114 can be alphabetic, numerical, or alphanumerically based, the preferred acrostic mnemonic device 114 of the present invention is alphabetically based in the form of grammatically correct sentence(s). Each acrostic mnemonic device 114 includes an easy to-be-remembered sentence available in multiple languages. The acrostic mnemonic sentence 114 generated is one whereby the user takes the first letter of words on the to-be remembered memory list (ML) 110 or 112 and uses the words as the first letter of other words to form a meaningful sentence in the users chosen interest category (IAD) or (CIAD) 108.

One aspect of the present invention 100 includes the personal mnemonic generating program embodied on a computer-readable medium for improving the user's memory of finite data sets based on the user's customized areas of interest to generate "to-be remembered" sentences. This embodiment includes at least one computing device 200 having a memory, at least one processor, and means for displaying information to a computer user. The computing device 200 is preferably a computer and is utilized for processing basic components and coded functions such as; memory list entry function 110 or 112, standard dictionary and thesaurus functions 126 or 128 having at least one multilingual words database, dictionary and thesaurus customization tools 126 or 128, standard interest area database (IAD) and custom interest area database (CIAD) function 108, grammar-based mnemonic generation engine function 124, mnemonic customization 132 and memorization 136 tool functions, and at least one storage database 122 having a searchable database function for saving 120 memory lists 110 or 112, user-generated interest information, acrostic mnemonic devices 114, user system override, and user testing and feedback information 118.

In another embodiment of the present invention 100, the personal mnemonic generating program embodied is on a computer-readable medium for improving the user's memory of finite data sets based on the user's customized areas of interest to generate "to-be remembered" sentences. The invention 100 includes, but is not limited to, a computer means 200; means for entering data; means for displaying information to the user, means for imputing and storing lists of items (ML) 110 or 112 to remember from a memory list entry function; means for processing a grammar-based mnemonic generation engine function 124 using words from a dictionary and thesaurus multi-lingual word database 126 and/or 128; means for inputting new words to be added to the dictionary and thesaurus database utilizing a dictionary and thesaurus customization tool function 126 or 128; means for selecting words or content items from a category in a standard interest area database 108; means for selecting a personalized interest areas and content items from a custom interest area database (CIAD) 108 in any language 102; means for collecting inputs and providing outputs utilizing at least one graphical user interface GUI; means for generating acrostic mnemonic sentences 114 based on grammatically correct sentences in multiple languages 102 utilizing a grammar-based mnemonic generation engine function 124; means for permitting users to replace pieces of an automatically generated, acrostic mnemonic sentence 114 word by word or in its entirety utilizing a mnemonic customization tool function 136; means for facilitating, reinforcing, and recalling of the acrostic mnemonic device 114 and the memory lists (ML) 110 or 112 and providing a testing and feedback system 118 permitting the user to practice the acrostic mnemonic device 114 and associated memory list (ML) items 110 or 112 to mastery utilizing a mnemonic memorization tool function 136; means for storing user-generated interest information, saving 120 memory lists 110 or 112 and acrostic mnemonic sentences 114, and saving 120 testing and feedback information 118 in a storage database 122 having a searchable database function; means for adjusting the number of letters to be utilized in an acrostic mnemonic sentence 114 utilizing a letter inclusion adjustment function 134; means for selecting for individual cognitive differentials having a customizing function utilizing cognition level function 130; and means for modifying 116 a generated acrostic mnemonic sentence 114 at any time utilizing a user system override and the customization tool function 132.

The means for inputting new words to be added to the dictionary and thesaurus database utilizing a dictionary and thesaurus customization tool function 126 and 128 is based on semantic relationships between items. Furthermore, the means for selecting words or content items from a category in a standard interest area database 108 includes common, multi-lingual words. In addition, the present invention 100 further includes a means for printing both user inputs and system outputs utilizing a print function (not shown).

Another embodiment of the present invention 100 is a method of generating acrostic mnemonic devices from finite data sets whereby customized areas of specific interest are provided by the user to assist in improving the memory of the user, executed by a computer. The method includes, but not limited to, the steps of: inputting new items (ML) 110 to be remembered to create a new acrostic mnemonic device 114, which further includes the steps of selecting a preferred language 102 of the user, inputting the list of items (ML) 110 or 120 the user chooses to remember, selecting an area of interest from the interest area database (IAD), or creating and inputting a new customized interest area database (CIAD) 108 from which an acrostic mnemonic device is generated 114. The method also includes the steps of generating an acrostic mnemonic device 114 from words in the interest area database (IAD) or the customize interest area database (CIAD) 108 and from a grammar-based mnemonic generation engine function 124 using words from at least one multi-lingual word database; finalizing the acrostic mnemonic device 114; actuating the mnemonic memorization tool function 136 to test 118 user to recall the finalized acrostic mnemonic device and providing feedback 118 from the mnemonic memorization tool function 136 permitting the user to practice the finalized acrostic mnemonic device 114 and the associated memory list items (ML) 110 or 112 to mastery; actuating the mnemonic customization tool function 132 permitting the user to replace 116 pieces of an automatically generated, acrostic mnemonic device 114 piece by piece or in its entirety; and saving 120 the finalized acrostic mnemonic device 114, the associated item list (ML) 110 or 112, and the users test history in an integrated searchable database 122.

In addition to the step of inputting new items (ML) 106 and 110 to be remembered to create a new mnemonic device, the method of the present invention 100 alternatively includes reviewing and recalling previously stored item lists (ML) 106 and 112, or acrostic mnemonic devices 114. Preferably, the step of generating an acrostic mnemonic device 114 is derived from the first letters of the words from the memory item list (ML) 110 or 112 to form an easy "to-be remembered" acrostic mnemonic device 114. The step of using words from a multi-lingual word database includes a standard dictionary function 126 and standard thesaurus function 128.

The method of the present invention 100 further includes the step of implementing the letter inclusion adjustment function 134 to adjust the number of letter from the beginning of each word in the list of items (ML) 110 or 112. The mnemonic customization tool function 132 is used to generate an acrostic mnemonic device 114 to a set number of letters (3 letters)(or two or more letters), numbers or symbols. If, however, there is no word that grammatically fits into the acrostic mnemonic device 114 based on the predetermined number of letters required, the method further includes the step of providing a default item using the greatest number of letters based on the words in the multi-lingual databases.

All aspects and embodiments of the present invention 100 further include the steps of providing interactive instruction in the form of a tutorial 104 on the effectiveness and use of the mnemonic devices 114 at the beginning of the program or at any or all steps of the method; providing feedback 118 from the mnemonic memorization tool function 136 which further includes the step of testing 118 the user's performance by displaying any errors, by providing correct items, and by displaying a quantitative analysis of the user's performance; selecting the cognition level function 130 permitting the user to select an acrostic mnemonic device 114 to specific individual cognitive differentials (cognition differentials are selected from the group consisting of age, intellect, and disability); providing at least one graphical user interface (GUI) for collecting user inputs and providing system outputs, printing the user inputs and the system outputs; and modifying 116 new acrostics or previously stored acrostics by personally changing one, or more of the words within the mnemonic device 114 at any step by means of a user system override and by means of customization tool functions 132.

Example of a Preferred Method of Generating the Acrostic Mnemonic Device

On first use, the user is provided with a brief tutorial 104 on the effectiveness and use of mnemonic devices (easy to-be-remembered sentences). The tutorial 104 is optional at the beginning and at any or all steps of the present invention 100. The user then decides to input new items to be remembered 110, or recalls previously stored items in the memory lists (ML) 112 or acrostic mnemonic devices 114.

If the user chooses 106 to input a new list of items (ML) 110 and create a new acrostic mnemonic device 114, the user is prompted to go through several steps. The first step includes selecting a language 102 in which the program will be accessed. (Note: selecting a preferred language can be performed at any step of the present invention 100). For example, if the preferred language of the user is English, the user will select that option. Secondly, the user is prompted to input the list of items (ML) 110 chosen to be remembered. Next, the user will be prompted to select an area of interest from the interest area database (IAD) or create a new custom interest area database (CIAD) 108 from which an acrostic mnemonic sentence will be generated 114. The acrostic mnemonic device generated 114 is one whereby the first letter of words on the to-be remembered memory list (ML) 110 or 112 form a meaningful sentence in the users chosen interest category (IAD or CIAD) 108.

At the user's request, the grammar-based mnemonic generation engine function 124 will generate an acrostic mnemonic device 114 base on the first letter (initially by default) of each word in the ML 110 or 122 from words in the selected interest area 108. The user is prompted the option of adjusting the number of letters from the beginning of each word in the ML 110 or 112 by the letter inclusion adjustment function 134 which is then to be used in the generation of the acrostic up to preferably a maximum of three letters. For example, a mnemonic sentence would be one which may read: "every good boy does fine", as in the notes in a music scale, E, G, B, D, & F. If there is no word that fits grammatically into the acrostic design, based on the number of letters required, the program will provide a default item using the greatest number of letters possible based on the words in the dictionary database 126. The program will identify those words using less than the desired number of letters. (Note: All of these functions will be language specific).

Once the mnemonic structure is finalized, the user may select the memorization-testing feature (mnemonic memorization tool functions 136). The program will then prompt the user to recall 118 the words making up the mnemonic.

After each attempt by the user is performed, feedback information 118 will be displayed to the user by the mnemonic memorization tool function 136. This function 136 will inform the user of any errors, provided correct items, and present the user will a quantitative measure of their performance. There are many forms of quantitative information that is known in the art that can be utilized in the present invention 100. The program will then prompt the user to a similar test and feedback session 118 for the ML items 110 or 112. The user will be prompted the option to select the ML memorization task at any time or repeat the memorization segments as often as the user would prefer. In addition, the user will be prompted the option to save 120 the mnemonic device 114, the associated ML 110 or 112, and their test history in an integrated, searchable database 122.

Figure 8:
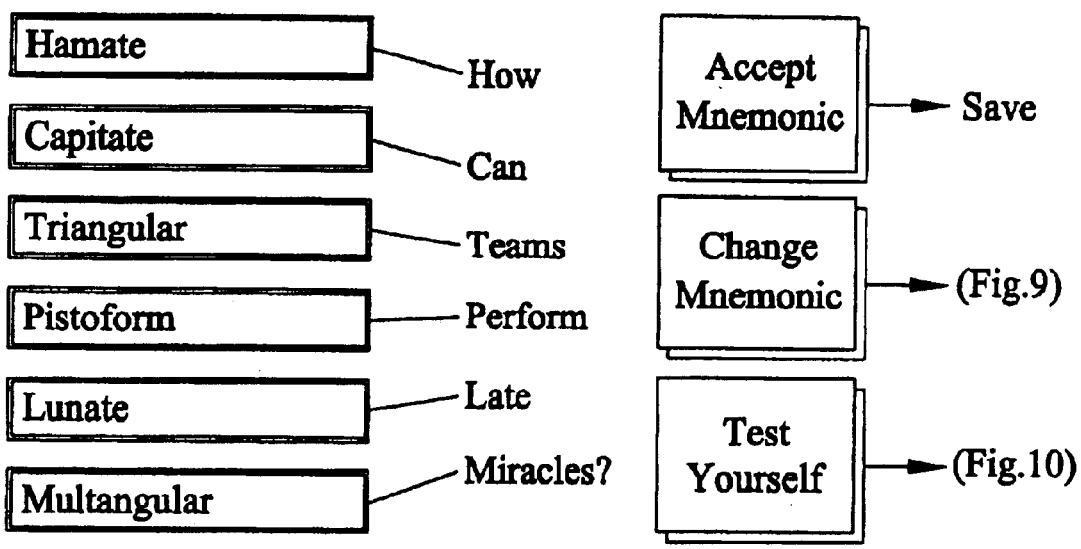
FIG. 8 shows a fifth screen page that has generated a mnemonic for the list to be remembered using the personal interest category title of FIG. 7.
Figure 9:
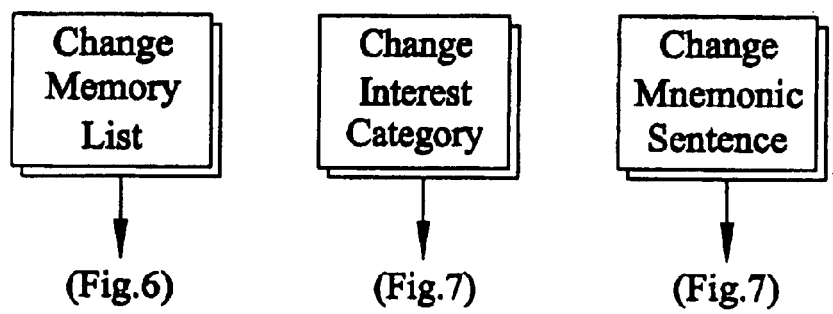
FIG. 9 shows a sixth screen page that allows the user the choices of changing the memory list, changing the interest category or changing the mnemonic sentence after clicking on the icon of "Change Mnemonic" in FIG. 8.

A preferred method of using the novel invention in a computer program format that can be available on a personal computer though a floppy disk, compact disk, and the like, as well as be accessible on the world wide web through a website and/or be downloaded to a personal computer, will now be described in reference to FIGS. 4–11. FIG. 4 shows a first screen menu page of the invention. FIG. 5 shows a second screen page for creating a title of a new memory list from the menu page of FIG. 4. FIG. 6 shows a third screen page for listing the items to be remembered for the new list of FIG. 5. FIG. 7 shows a fourth screen page for typing in a personal interest category title for the listed items of FIG. 6. FIG. 8 shows a fifth screen page that has generated a mnemonic for the list to be remembered using the personal interest category title of FIG. 7. FIG. 9 shows a sixth screen page that that allows the user the choices of changing the memory list, changing the interest category or changing the mnemonic sentence after clicking on the icon of "Change Mnemonic" in FIG. 8. For example, the generated mnemonic can be fully saved either in whole or in parts, where the user can selectively change words found within that sentence on their own. FIG. 10 shows a seventh screen page for testing the user by having the user input the list of items after clicking on the "Test Yourself" icon in FIG. 8. FIG. 11 shows another screen page of FIG. 10 that allows the user to score themselves by filling in the blank spaces. Going back to the first menu page in FIG. 4 allows the user to create a new memory list, and/or review other memory lists, and the like.

Students learning any type of discipline in school such as elementary school, high school, college, or university or graduate school(i.e. medical school, law school) professional technical schools(i.e. trade schools, and the like) can benefit from utilizing the present invention 100. Major advantages of the present invention include, but are not limited to, receiving better grades, faster advancement, improved memory, makes learning fun, quick and easy to download or install the present invention, increased motivation, higher verbal performance, and possibly relieving Alzheimer's effects. Additionally, the invention can be used in work settings for training purposes, and the like. For example, pilots, drivers, truck drivers, operators of machinery where task skills are needed can use the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of generating acrostic mnemonic devices whereby customized areas of specific interest are provided by the user to assist in improving the memory of the user solely as a memory education tool for student discipline learning and for worker skill training applications, executed by a computer, comprising the steps of:
   (a) separately-inputting a list of new items (ML) to be remembered by the user to create a new acrostic mnemonic device into the computer, which includes the steps of;
      (i) selecting a preferred language of the user;
      (ii) inputting the list of the new items (ML) the user chooses to remember;
      (iii) selecting an area of interest from one of: an existing interest area database (IAD), or a new customized and personalized interest area database (CIAD), in the computer;
   (b) generating a finalized acrostic mnemonic device created by the user from words in one of said (IAD) or said (CIAD), from a grammar-based mnemonic generation engine using words from at least one multi-lingual word database, the finalized acrostic mnemonic device being an easy to-be remembered sentence;
   (c) actuating a mnemonic memorization tool function for testing the user to recall said acrostic mnemonic device and providing feedback from said mnemonic memorization tool function permitting the user to practice said acrostic mnemonic device and said memory list (ML);
   (d) actuating the mnemonic memorization tool function for facilitating, reinforcing, and recalling of said acrostic mnemonic device and said memory list (ML);
   (e) saving said finalized acrostic mnemonic device as a personalized mnemonic device, said associated item list (ML), and the users test history in the computer; and
   (f) using steps (a), (b), (c), (d), and (e) and the personalized mnemonic device, for improving the memory of the user solely as a memory education tool for the users being students learning any discipline or the users being workers needing training for worker related skills.

2. The method according to claim 1, wherein said step of inputting new items (ML) to be remembered to create a new mnemonic device includes alternatively reviewing and recalling previously stored item lists (ML) or acrostic mnemonic devices.

3. The method according to claim 1, wherein said step of generating an acrostic mnemonic device is derived from the first letters of the words from the memory item list (ML) to form an easy "to-be remembered" acrostic mnemonic device.

4. The method according to claim 1, wherein said step of using words from a multi-lingual word database in step (b) includes a standard dictionary function and standard thesaurus function.

5. The method according to claim 1, wherein said step of generating an acrostic mnemonic device from words in said (IAD) or said (CIAD) utilizing a grammar-based mnemonic generation engine using words from at least one multi-lingual word database identifies those words using less than the desired number of letters.

6. The method according to claim 1, further comprising the step of implementing the letter inclusion adjustment function to adjust the number of letters from the beginning of each word in the list of items (ML) from the mnemonic customization tool to be used in said generating of acrostic mnemonic device to a set number of letters.

7. The method according to claim 6, wherein said implementing the letter inclusion adjustment function to adjust the number of letter from the beginning of each word in the list of items (ML) from the mnemonic customization tool to be used in said generating of acrostic mnemonic device to three letters.

8. The method according to claim 1, further comprising the step of providing a default item using the greatest number of letter based on the words in said multi-lingual databases if there is no word that grammatically fits into said acrostic mnemonic device based on the predetermined number of letters required.

9. The method according to claim 1, further comprising the step of providing interactive instruction in the form of a tutorial on the effectiveness and use of said generated mnemonic devices at the beginning of the program or at any step of said method.

10. The method according to claim 1, wherein said step of providing feedback information from said mnemonic memorization tool function further comprising the step of testing the user's performance by displaying any errors, by providing correct items, and by displaying a quantitative analysis of the user's performance.

11. The method according to claim 1, further comprising the step of selecting the cognition level function permitting the user to select an acrostic mnemonic device specific to individual cognitive differentials.

12. The method according to claim 11, wherein said individual cognition differentials are selected from the group consisting of age, intellect, and disability.

13. The method according to claim 1, further comprising the step of providing at least one graphical user interface (GUI) for collecting user inputs and providing system outputs.

14. The method according to claim 13, further comprising the step of printing said user inputs and said system outputs.

15. The method according to claim 1, further comprising the step of modifying new acrostics or previously stored acrostics by personally changing one, or more of the words within said mnemonic device at any step by means of a user system override and by means of the customization tool functions.

16. The method according to claim 1, wherein said finalized acrostic mnemonic device is in the form of a meaningful grammatically correct sentence.

17. An acrostic mnemonic device for improving memory of a user using customized areas of interest of the user, solely as a memory education tool for student discipline learning and for worker skill training applications, with a computer, comprising: colon
   means for inputting a list of new items (ML) to be remembered to create a new acrostic mnemonic device into the computer, which includes;
      (i) means for selecting a preferred language of the user;
      (ii) means for inputting the list of the new items (ML) the user chooses to remember;
      (iii) means for selecting an area of interest from one of: an existing interest area database (IAD), or a new customized and personalized interest area database (CIAD), in the computer;
   means for generating a finalized acrostic mnemonic device by the user from words in one of said (IAD) or said (CIAD), from a grammar-based mnemonic generation engine using words from at least one multi-lingual word database, the finalized acrostic mnemonic device being an easy to-be remembered sentence;
   means for actuating a mnemonic memorization tool function for testing the user to recall said finalized acrostic mnemonic device and for providing feedback from said mnemonic memorization tool function permitting the user to practice said finalized acrostic mnemonic device and said memory list (ML);
   means for facilitating, reinforcing, and recalling of said finalized acrostic mnemonic device and said memory item list (ML);
   means for saving said finalized acrostic mnemonic device, said memory list (ML), and test history of the user in the computer as a personalized mnemonic device; and
   means for using the inputting means, the generating means, the actuating means, the facilitating means, the saving means and the personalized mnemonic device solely as a memory education tool for improving the memory of the user for students learning any discipline and workers needing training for worker related skills.

18. The acrostic mnemonic device according to claim 17 wherein said means for inputting the new items (ML) to be remembered includes:
   means for alternatively reviewing and recalling previously stored item lists (ML) or acrostic mnemonic devices.

19. The acrostic mnemonic device according to claim 17, wherein said means for generating a finalized acrostic mnemonic device includes:
   means for forming meaningful grammatically correct sentence derived from the first letters of the words from the memory item list (ML).

20. The acrostic mnemonic device according to claim 17, wherein said multi-lingual word database includes: a standard dictionary function and standard thesaurus function.

21. The acrostic mnemonic device according to claim 17, wherein said means for generating a finalized acrostic mnemonic device includes:
   means for identifying words using less than the desired number of letters.

22. The acrostic mnemonic device according to claim 17, further comprising:
   means for implementing a letter inclusion adjustment function to adjust the number of letters from the beginning of each word in the list of items (ML) from the mnemonic customization tool to be used in said means for generating a finalized acrostic mnemonic device to a set number of letters.

23. The acrostic mnemonic device according to claim 22, wherein said means for implementing the letter inclusion adjustment function includes: three letters.

24. The acrostic mnemonic device according to claim 17, further comprising:
   means for providing a default item using the greatest number of letter based on the words in said multi-lingual databases if there is no word that grammatically fits into said acrostic mnemonic device based on the predetermined number of letters required.

25. The acrostic mnemonic device according to claim 17, further comprising:
   means for providing interactive instruction in the form of a tutorial on the effectiveness and use of said generated mnemonic devices.

26. The acrostic mnemonic device according to claim 17, further comprising:
   means for testing performance of the user by displaying any errors, by providing correct items, and by displaying a quantitative analysis of the user's performance.

27. The acrostic mnemonic device according to claim 17, further comprising:

means for selecting a cognition level function for permitting the user to select an acrostic mnemonic device specific to individual cognitive differentials.

28. The acrostic mnemonic device according to claim 27, wherein said individual cognition differentials are selected from the group consisting of age, intellect, and disability.

29. The acrostic mnemonic device according to claim 17, further comprising:

means for providing at least one graphical user interface (GUI) for collecting user inputs and providing system outputs.

30. The acrostic mnemonic device according to claim 29, further comprising: means for printing said user inputs and said system outputs.

31. The acrostic mnemonic device according to claim 17, further comprising:

means for modifying new acrostics or previously stored acrostics by personally changing one, or more of the words within said mnemonic device by a user system override and by the customization tool functions.

32. The acrostic mnemonic device according to claim 17, wherein said finalized acrostic mnemonic device is in the form of a grammatically correct sentence.

33. A method of generating an acrostic mnemonic device using customized areas of specific interest provided by a user for in improving the memory of the user solely as a memory education tool for student discipline learning and for worker skill training applications, comprising the steps of:

(a) inputting a list of new items (ML) to be remembered to create a new acrostic mnemonic device into a computer, by;

(i) inputting the list of the new items (ML) the user chooses to remember;

(ii) selecting an area of interest from one of: an existing interest area database (IAD), or a new customized and personalized interest area database (CIAD), in the computer,;

(b) generating a finalized acrostic mnemonic device created by the user from words in one of said (IAD) or said (CIAD), using words from at least one multi-lingual word database, the finalized acrostic mnemonic device being an easy to be remembered sentence;

(c) testing the user to recall said finalized acrostic mnemonic device by actuating a mnemonic memorization tool function;

(d) providing feedback from said mnemonic memorization tool function to permit the user to practice said finalized acrostic mnemonic device and said memory list (ML);

(e) saving said finalized acrostic mnemonic device, said associated item list (ML), and the users test history in the computer as a personalized mnemonic device;

(f) using steps (a), (b, c), (d, (e) and the personalized mnemonic device for improving the memory of the user solely as a memory education tool for the user being a student learning a discipline, or the user being a worker needing training for a skill.

34. The method of claim 33, wherein the step of providing feedback information from said mnemonic memorization tool function further comprising the step of:

testing performance of the user by displaying errors, by providing correct items, and by displaying a quantitative analysis of the user's performance.

\* \* \* \* \*